United States Patent
Kolwalkar et al.

(10) Patent No.: US 10,079,485 B2
(45) Date of Patent: Sep. 18, 2018

(54) INDUCTION GENERATOR SYSTEM WITH A GRID-LOSS RIDE-THROUGH CAPABILITY

(71) Applicant: GENERAL ELECTRIC COMPANY, Schenectady, NY (US)

(72) Inventors: Amol Rajaram Kolwalkar, Bangalore (IN); Arvind Kumar Tiwari, Bangalore (IN); Rajendra Naik, Bangalore (IN); Sanjay Vijayaraghavan, Bangalore (IN)

(73) Assignee: General Electric Company, Schenectady, NY (US)

( * ) Notice: Subject to any disclaimer, the term of this patent is extended or adjusted under 35 U.S.C. 154(b) by 362 days.

(21) Appl. No.: 14/918,950

(22) Filed: Oct. 21, 2015

(65) Prior Publication Data

US 2016/0111872 A1    Apr. 21, 2016

(30) Foreign Application Priority Data

Oct. 21, 2014 (IN) .......................... 5251/CHE/2014

(51) Int. Cl.
*H02J 9/00* (2006.01)
*H01F 1/00* (2006.01)
(Continued)

(52) U.S. Cl.
CPC .............. *H02H 7/067* (2013.01); *H02J 3/00* (2013.01); *H02J 11/00* (2013.01); *H02K 7/1823* (2013.01);
(Continued)

(58) Field of Classification Search
CPC ...... Y02E 40/30; H02H 7/067; H02K 7/1823; H02J 11/00; H02J 2003/00; H02J 3/00; H02J 3/18; H02J 3/32; H02P 9/006
See application file for complete search history.

(56) References Cited

U.S. PATENT DOCUMENTS 5,811,960 A * 9/1998 Van Sickle ............ H02J 9/066
                                                          307/67
5,880,537 A * 3/1999 Windhorn ............ H02J 9/066
                                                          307/64
(Continued)

FOREIGN PATENT DOCUMENTS

EP    2017472 A2    1/2009
EP    2270331 A2    1/2011
(Continued)

OTHER PUBLICATIONS

Mohammadzadeh., "Improve the Voltage Profile of Grid Connected Induction Generator Under Load Variation and Symmetrical Short Circuit in the Presence of SVC and STATCOM",Electrical Power Distribution Networks (EPDC), 2012 Proceedings of 17th Conference On,May 2-3, 2012,pp. 1-6 Tehran.
(Continued)

*Primary Examiner* — Jared Fureman
*Assistant Examiner* — Esayas Yeshaw
(74) *Attorney, Agent, or Firm* — GE Global Patent Operation; Rita D. Vacca

(57) ABSTRACT

A power generation system is provided. The system includes a prime mover for transforming a first energy to a second energy. The system also includes an induction generator operatively coupled to the prime mover and configured to generate electrical power using the second energy. The system further includes an inverter electrically coupled to the induction generator for controlling a terminal voltage of the induction generator during a grid-loss condition. The system also includes a power dissipating device operatively coupled to the inverter for dissipating power generated by the induction generator during the grid-loss condition.

20 Claims, 7 Drawing Sheets

(51) Int. Cl.
*H01F 3/00* (2006.01)
*H02J 3/30* (2006.01)
*H02H 7/06* (2006.01)
*H02K 7/18* (2006.01)
*H02J 11/00* (2006.01)
*H02J 3/00* (2006.01)
*H02P 9/00* (2006.01)
*H02J 3/18* (2006.01)
*H02J 3/32* (2006.01)

(52) U.S. Cl.
CPC ............... *H02P 9/006* (2013.01); *H02J 3/18* (2013.01); *H02J 3/32* (2013.01); *H02J 2003/001* (2013.01); *Y02E 40/30* (2013.01)

(56) References Cited

U.S. PATENT DOCUMENTS

| | | | |
|---|---|---|---|
| 7,038,329 B1 | 5/2006 | Fredette et al. | |
| 7,239,034 B2 | 7/2007 | Gehret et al. | |
| 7,289,920 B2 | 10/2007 | Suliman et al. | |
| 7,329,152 B2* | 2/2008 | Mori | G06F 3/0227 438/928 |
| 7,665,304 B2 | 2/2010 | Sundel | |
| 8,193,654 B2* | 6/2012 | Rickard | F03B 15/00 290/44 |
| 8,575,780 B2* | 11/2013 | Moon | H02J 9/062 307/125 |
| 8,866,340 B2* | 10/2014 | Alam | H02J 3/32 307/60 |
| 9,325,173 B2* | 4/2016 | Varma | H02J 3/386 |
| 2002/0108372 A1 | 8/2002 | Bronicki | |
| 2003/0062775 A1* | 4/2003 | Sinha | H02J 9/08 307/68 |
| 2003/0213245 A1 | 11/2003 | Yates et al. | |
| 2003/0213246 A1 | 11/2003 | Coll et al. | |
| 2008/0018175 A1* | 1/2008 | McNamara | H02J 3/005 307/84 |
| 2010/0292852 A1 | 11/2010 | Gertmar et al. | |
| 2011/0198846 A1* | 8/2011 | Wakasa | F03D 7/0272 290/44 |
| 2012/0205986 A1* | 8/2012 | Frampton | H02J 3/381 307/84 |
| 2013/0300380 A1 | 11/2013 | Brunotte et al. | |
| 2015/0188468 A1* | 7/2015 | Xu | H02P 9/007 290/44 |
| 2015/0300318 A1* | 10/2015 | Mayer | F03D 7/0272 290/44 |

FOREIGN PATENT DOCUMENTS

| | | |
|---|---|---|
| JP | 2003199252 A | 7/2003 |
| WO | 2011146388 A1 | 11/2011 |

OTHER PUBLICATIONS

Ingeco Clean Energy Systems, "Clean Cycle 125—ORC Unit for Waste Heat Power Generation", retrieved from http://www.ingecoweb.com/eng/prodotto_dettaglio.php?id=12 on Mar. 7, 2016, known at least since May 7, 2014.

Progeco Engineering & Solutions, "Clean Cycletm 125, Modular ORC Unit with 125 kW of Electrical Power", retrieved from http://www.progecoweb.it/area_amministrazione/file_upload/prodotto/12/PRPICC125R01EN_PROGECO(CC125-PI)_[EN].pdf on Mar. 7, 2016, known at least since May 7, 2014.

European Search Report and Opinion issued in connection with corresponding EP Application No. 15190243.4 dated Feb. 22, 2016.

Kaishan Compressor, "Organic Rankine Cycle Power Plant Expansion Screw", 2014, retrieved from http://www.kaishancompressor.com/Industry-Products/Screw-Expander-Power-Stations/Organic-Rankine-Cycle-Power-Plant-Expansion-Screw/Organic-Rankine-Cycle-Power-Plant-Expansion-Screw.html on Mar 7,2016.

* cited by examiner

INDUCTION GENERATOR SYSTEM WITH A GRID-LOSS RIDE-THROUGH CAPABILITY

BACKGROUND

Embodiments of the present invention generally relate to power generation systems and more particularly, relate to induction generator systems with a grid-loss ride-through capability.

Different kinds of power generation systems are used to generate power from different sources of energy. The power generation systems may include a prime mover that converts a first form of energy to a second form of energy. The second form of energy is used by a generator to generate electrical power. The power generation systems may include a synchronous generator or an asynchronous generator to generate power. In power generation systems with asynchronous generators, alternatively known as induction generators, the induction generator rotates at a desired speed to generate power, which is transmitted to the power grid via an AC link.

However, in situations, where a grid outage occurs due to a fault on the power grid, speed of the prime mover increases which results in an increase of speed of the induction generator coupled to the prime mover. Such an increase in speed leads to undesirable results. Therefore, upon identification of the grid outage, the prime mover is forcefully and rapidly shutdown or otherwise bypassed to overcome the undesirable results of over speeding. However, such forcefull and rapid shutdowns could damage the prime mover driving the induction generator. Frequent grid outages results in performance degradation of the power generation system over time and higher maintenance costs.

Hence, there is a need for an improved system to address the aforementioned issues.

BRIEF DESCRIPTION

Briefly, in accordance with one embodiment, a power generation system is provided. The system includes a prime mover for transforming a first energy to a second energy. The system also includes an induction generator operatively coupled to the prime mover and configured to generate electrical power using the second energy. The system further includes an inverter electrically coupled to the induction generator for controlling a terminal voltage of the induction generator during a grid-loss condition. The system also includes a power dissipating device operatively coupled to the inverter for dissipating power generated by the induction generator during the grid-loss condition.

In another embodiment, a method for ride-through of induction generator during a grid-loss condition is provided. The method includes identifying a grid-loss condition in a power generation system. The method also includes disconnecting a power grid from an induction generator using a switch. The method further includes activating a backup generator upon identification of the grid-loss condition. The method also includes controlling an inverter to control a terminal voltage of the induction generator. The method further includes dissipating power generated by the induction generator using a power dissipating device.

In yet another embodiment, a retrofit unit for providing a grid-loss ride-through capability to an induction generator in a power generation system is provided. The retrofit unit includes an inverter operatively coupled to the induction generator and configured to control a terminal voltage of the induction generator during a grid-loss condition and a power dissipating device electrically coupled to the inverter and configured to dissipate power generated by the induction generator during the grid-loss condition.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention include an induction generator system with a grid-loss ride-through capability and a method for the same. The system includes a prime mover for transforming a first energy to a second energy. The system also includes an induction generator operatively coupled to the prime mover and configured to generate electrical power using the second energy. The system further includes an inverter electrically coupled to the induction generator for controlling a terminal voltage of the induction generator during a grid-loss condition. The system also includes a power dissipating device operatively coupled to the inverter for dissipating power generated by the induction generator during the grid-loss condition.

Industrial plants include multiple industrial loads that require high power for their operation. Therefore, the industrial plants employ independent power generation systems that generate power for operating the industrial loads. In some plants, the power generation systems are unable to match the requirement of the industrial loads. In such cases, a difference between the power required by the industrial loads and an output of the power generation system is fulfilled by power from an external source such as a power grid. In some situations, a fault may occur at the power grid, due to which a grid outage or a grid loss condition may arise, where the power grid is unable to provide any power to the industrial loads. To overcome such situation, a backup generator such as a diesel generator is activated to provide power to the industrial loads until the power grid becomes operational. However, the backup generator may take up to few minutes to initiate its operations after receiving the activation command, which may adversely affect the power generation system in the industrial plant. Therefore, an improved power generation system is described to overcome the aforementioned issues.

Figure 1:
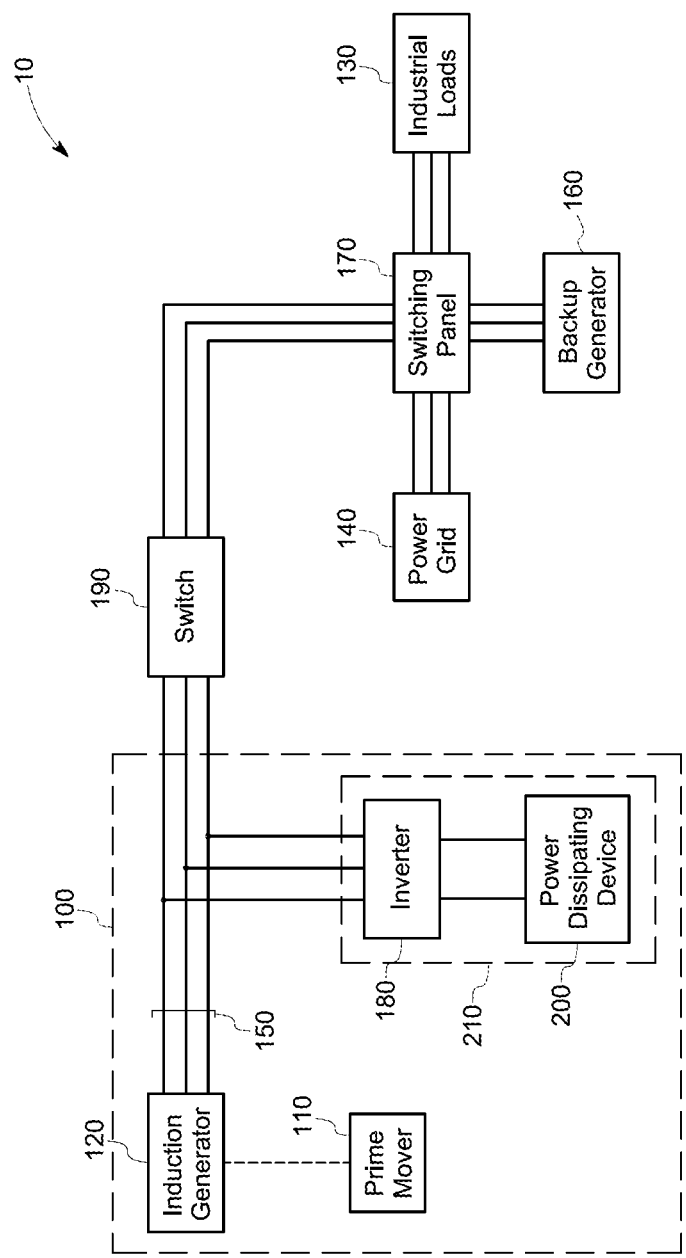
FIG. 1 is a block diagram representation of a power generation system in accordance with an embodiment of the invention.

FIG. 1 is a block diagram representation of an industrial plant 10 including a power generation system 100 in accordance with an embodiment of the invention. The power generation system 100 includes a prime mover 110 that converts a first energy to a second energy. In one embodiment, the prime mover 110 may include a gas turbine, a steam turbine, a combination of the gas turbine and the steam turbine, or a wind turbine. In another embodiment, the prime mover 110 may include an organic rankine cycle based power generation systems. In a specific embodiment, the organic rankine cycle based power generation systems may include biomass power plant, geothermal power plants, solar thermal power plants. In one example, the gas turbine uses natural gas and atmospheric air to generate a high temperature and high pressure outflow, which is used to generate a mechanical output. Similarly, the steam turbine uses water instead of natural gas and atmospheric air to generate the mechanical output from heat. In another example, the wind turbine uses wind energy to generate the mechanical output. In one example, the combination of the gas turbine and the steam turbine may include a combined cycle power plant, where the steam turbine comprises a heat recovery steam generator. In a specific example, the heat recovery steam generator may operate based on the organic rankine cycle to recover waste heat from the gas turbine or any waste process heat from the industrial plant. The prime mover 110 is operatively coupled to an induction generator 120 that generates electrical power from the mechanical output based on known principles of operation. Furthermore, the induction generator 120 is electrically coupled to industrial loads 130 and transmits the electrical power to the industrial loads 130 for their operation.

The industrial plant 10 is also coupled to a power grid 140 that further provides power to the industrial loads 130. In case the difference between a required power by the industrial loads is higher than the electrical power generated by the power generation system 100, the industrial plant 10 receives a difference in power between the required power and the electrical power generated by the power generation system 100 from the power grid 140. In contrast, if the electrical power generated by the power generation system 100 is higher than the power required by the industrial loads 130, excess electrical power generated by the power generation system 100 is transmitted to the power grid 140.

The industrial plant 10 further includes a backup generator 160. In one embodiment, the backup generator 160 may include a diesel generator. The backup generator 160 and the power grid 140 may be operatively coupled to the industrial loads 130 via a switching panel 170. In one embodiment, the switching panel 170 may include an auto mains failure panel. The switching panel 170 is used to couple the industrial loads 130 to either the power grid 140 or the backup generator 160.

During normal operation, the industrial loads 130 are operatively coupled to the induction generator 120 and the power grid 140. The induction generator 120 and the power grid 140 supply the electrical power generated by the induction generator 120 and from the power grid 140 to the industrial loads 130. However, an occurrence of a fault at the power grid 140 may lead to a grid-loss condition. In one embodiment, the grid-loss condition may include a condition in which the power grid 140 is not operating and is unable to provide power to the industrial loads 130. During such grid-loss conditions, the switching panel 170 disconnects the power grid 140 from the industrial loads 130 and couples the backup generator 160 to the industrial loads 130. Furthermore, upon identification of such grid-loss conditions, the backup generator 160 is activated; however, the backup generator 160 requires a predetermined time to initiate its operations. As discussed herein, the term "activated" represents a condition in which the backup generator 160 receives a command to start its operation. As discussed herein, the term "initiated" represents a condition where the backup generator 160 is operational after receiving the aforementioned command and is ready to support the industrial loads 130.

The power generation system 100 further includes an inverter 180 and a switch 190 electrically coupled to the induction generator 120 via an AC link 150. In one embodiment, the switch 190 may include a mechanical switch. The switch 190 is used to connect or disconnect the induction generator 120 from the industrial loads 130. The switch 190 is employed to disconnect the induction generator 120 from the industrial loads 130 and upon such disconnection the inverter 180 controls a terminal voltage of the induction generator 120 until the operations of the backup generator 160 are initiated. In one embodiment, the switch 190 and the switching panel 170 may change respective switching states simultaneously or the switch 190 may change its state after the switching panel 170 has coupled the industrial loads 130 to the backup generator 160. In a specific embodiment, the switching states of the switch 190 may include a first state where the induction generator 120 is coupled to the industrial loads 130 and a second state where the induction generator 120 is disconnected from the industrial loads 130.

In one embodiment, the inverter 180 may include a static synchronous compensator (STATCOM). The inverter 180 controls the terminal voltage of the induction generator 120 such that a synchronous frequency on a stator of the induction generator 120 is maintained during the predetermined time in which the backup generator 160 initiates its operations. Moreover, in another embodiment, the inverter 180 may be electrically coupled to a power dissipating device 200 which is used to dissipate the electrical power generated by the induction generator 120 during the predetermined time for initiation of the backup generator 160. In one embodiment, the inverter 180 may be electrically coupled to a DC capacitor. In an exemplary embodiment, the power dissipating device 200 may include a resistive element or an energy storage element. The power dissipating device 200 may further include a DC chopper operatively coupled in a parallel configuration to the resistive element or the energy storage element. Therefore, the use of the inverter 180 and the power dissipating device 200 in the power generation system 100 provides a ride-through capability to the induction generator 120 which allows the induction generator 120 to operate during a grid loss condition as well as during the predetermined time in which the backup generator 160 initiates its operations. In one embodiment, the inverter 180 and the power dissipating device 200 form a retrofit unit 210 which may be operatively coupled to any pre-existing power generation system to introduce a grid-loss ride-through capability in the pre-existing power generation system.

Furthermore, upon initiation of the backup generator 160, the inverter 180 enables synchronization of the terminal voltage of the induction generator 120 with a voltage generated by the backup generator 160. Once the terminal voltage is synchronized with the voltage generated by the backup generator 160, the switch 190 connects the induction generator 120 with the industrial loads 130 and the induction generator 120 transmits power to such industrial loads 130 until the power grid 140 is restored. Moreover, during the operation of the backup generator 160, the inverter 180 operates in standby mode or alternatively, the inverter 180 may provide reactive power in the power generation system to improve quality of power generated by the power generation system 100.

However, in some situations, the backup generator 160 may not initiate its operations within the predetermined time. In such situations, the prime mover 110 may be throttled down in a predefined manner to reduce the speed of the induction generator 120 at a predefined rate till the induction generator 120 is shut down. Such a shutdown procedure of the induction generator 120 results in minimum/no damages to the induction generator 120 in comparison to a conventional tripping shutdown procedure in an event of a grid-loss condition. Furthermore, the shutdown of the induction generator at the predefined rate enables the use of a power dissipating device 200 with a lesser power rating in comparison to the conventional tripping shutdown procedures which results in a cost reduction of the power dissipating device 200.

Subsequently, upon restoration of the power grid 140, the inverter 180 detects the restoration of the power grid 140 and re-synchronizes the induction generator 120 with the power grid 140. In one embodiment, the re-synchronization may include synchronizing a frequency of the induction generator 120 with the power grid 140 and a voltage of the inverter 180 with the voltage of the power grid 140. The switching panel 170 disconnects the industrial loads 130 from the backup generator 160 and couples the industrial loads 130 to the power grid 140. The power grid 140 supplies the power to the power grid 140 and the backup generator 160 is de-activated leading to shut down of the back-up generator 160. In such situation, the inverter 180 may either perform a reactive power control for the induction generator 120 or may remain idle without injecting any current in the power generation system 100. In one embodiment, the inverter 180 regulates the terminal voltage of the induction generator 120 until the power grid 140 starts supporting the industrial loads 130 and a transition from the backup generator 160 to the power grid 140 is completed.

Figure 2:
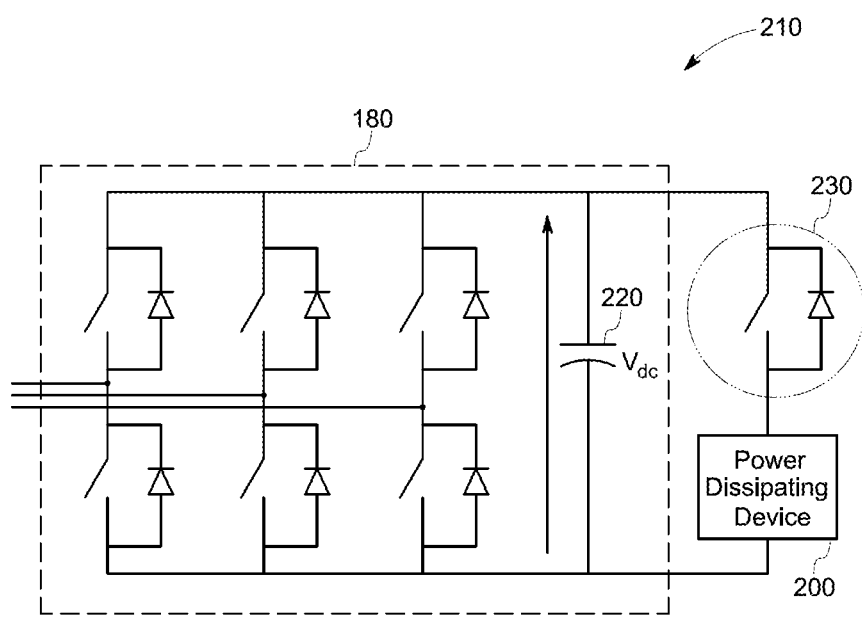
FIG. 2 is a schematic representation of a retrofit unit of FIG. 1 including the inverter and the power dissipating device in accordance with an embodiment of the invention.

FIG. 2 is a schematic representation of a retrofit unit 210 of FIG. 1 including the inverter 180 and the power dissipating device 200 in accordance with an embodiment of the invention. In this embodiment, the inverter 180 includes a three phase inverter. The inverter 180 includes three legs for three respective phases, which are coupled to each other in a parallel configuration. Each leg includes two switching units, where each of the switching unit includes a switch and a diode coupled in parallel to each other. In one embodiment, the switch may include an insulated gate bipolar transistor (IGBT), a metal-oxide-semiconductor field-effect transistor (MOSFET) or a combination thereof. Furthermore, the inverter 180 includes a DC capacitor 220 operatively coupled to the power dissipating device 200 via an inverter switch 230. The inverter switch 230 is operated in a conducting state to couple the power dissipating device 200 with the inverter 180. Alternatively, the inverter switch 230 is operated in a non-conducting state to decouple the power dissipating device 200 from the inverter 180.

During the predetermined time in which the backup generator 160 initiates its operations, the inverter 180 charges the energy storage element 220 using the power generated by the induction generator (FIG. 1). During a charging interval, the inverter switch 230 is operated in the non-conducting state until the voltage of the DC capacitor 220 (Vdc) reaches a first predefined threshold limit. Subsequently, the inverter switch 230 is operated in the conducting state, where the inverter switch 230 couples the DC capacitor 220 with the power dissipating device 200. In such configuration, the DC capacitor 220 discharges through the power dissipating device 200 till the voltage of the DC capacitor 220 (Vdc) reaches a second predefined threshold limit. The aforementioned process is repeated till the backup generator 160 initiates its operations. Once the backup generator 60 initiates its operations the inverter switch 230 is switched to a non-conducting state such that the DC capacitor does not get charged from the inverter.

Figure 3:
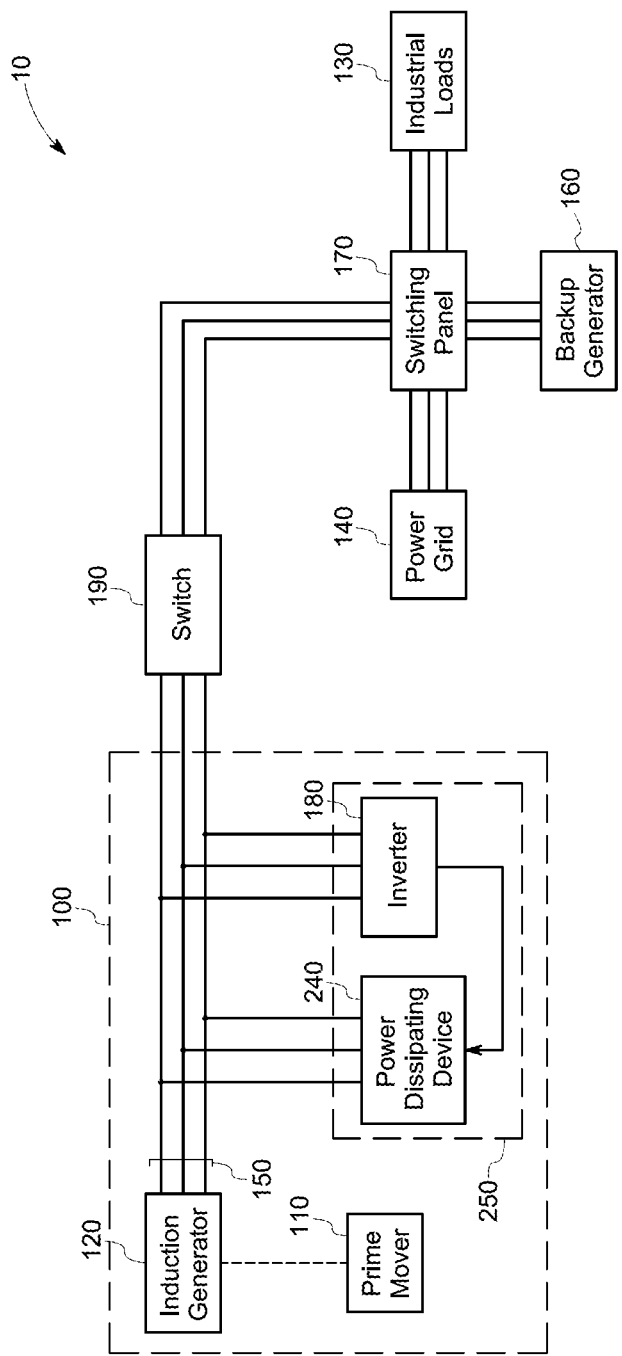
FIG. 3 is a block diagram representation of the power generation system including another embodiment of the retrofit unit of FIG. 1 in accordance with an embodiment of the invention.

FIG. 3 is another embodiment of the power generation system 100 of FIG. 1 where a power dissipating device 240 in a retrofit unit 250 may be coupled to the AC link 150 in contrast to FIG. 1 and FIG. 2 in accordance with an embodiment of the invention.

Figure 4:
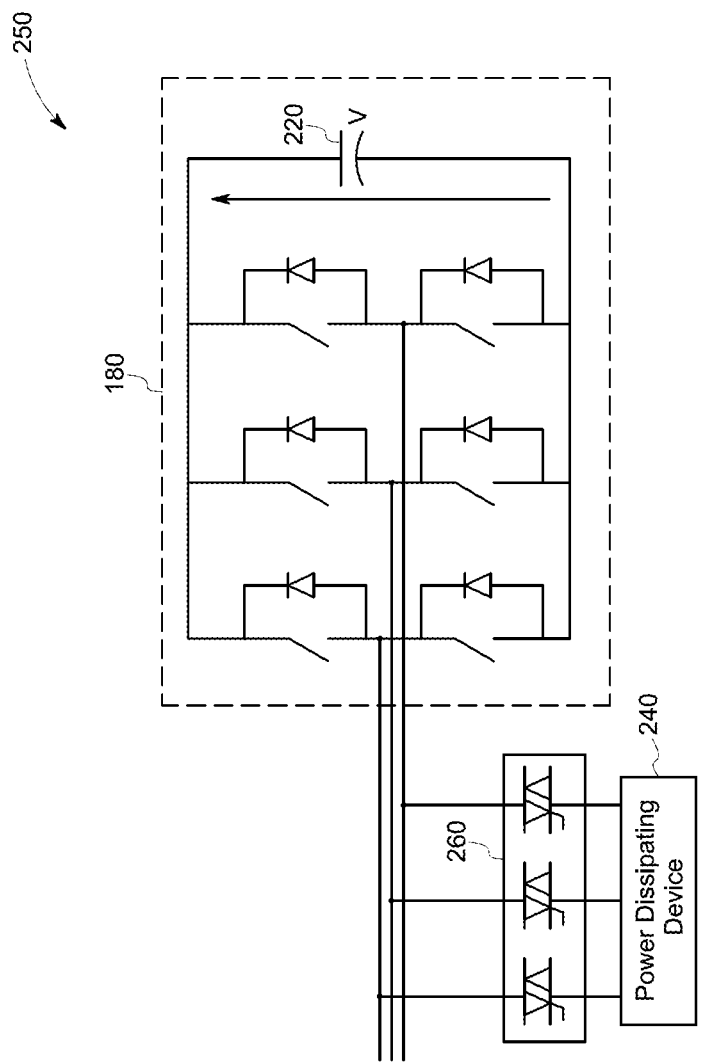
FIG. 4 is a schematic representation of the retrofit unit of FIG. 3 including a power dissipating device coupled to an AC link in accordance with an embodiment of the invention.

FIG. 4 is a schematic representation of the retrofit unit 250 of FIG. 3 which depicts the power dissipating device 240 coupled to the AC link 150 via one or more inverter switches 260. In this embodiment, the power generation system (FIG. 3) is a three phase power generation system and therefore, the power dissipating device is coupled to the AC link 150 via three inverter switches 260. Each of the inverter switches 260 is used to couple the power dissipating device 240 to a respective phase. In one embodiment, the inverter switch 260 includes a switching unit, where each of the switching unit includes a triode for alternating current (TRIAC) or an insulated gate bipolar transistor (IGBT). The operations of the power dissipating device and the inverter switches 260 are similar to the operations discussed above with respect to power dissipating device 200 and the inverter switch 230.

Figure 5:
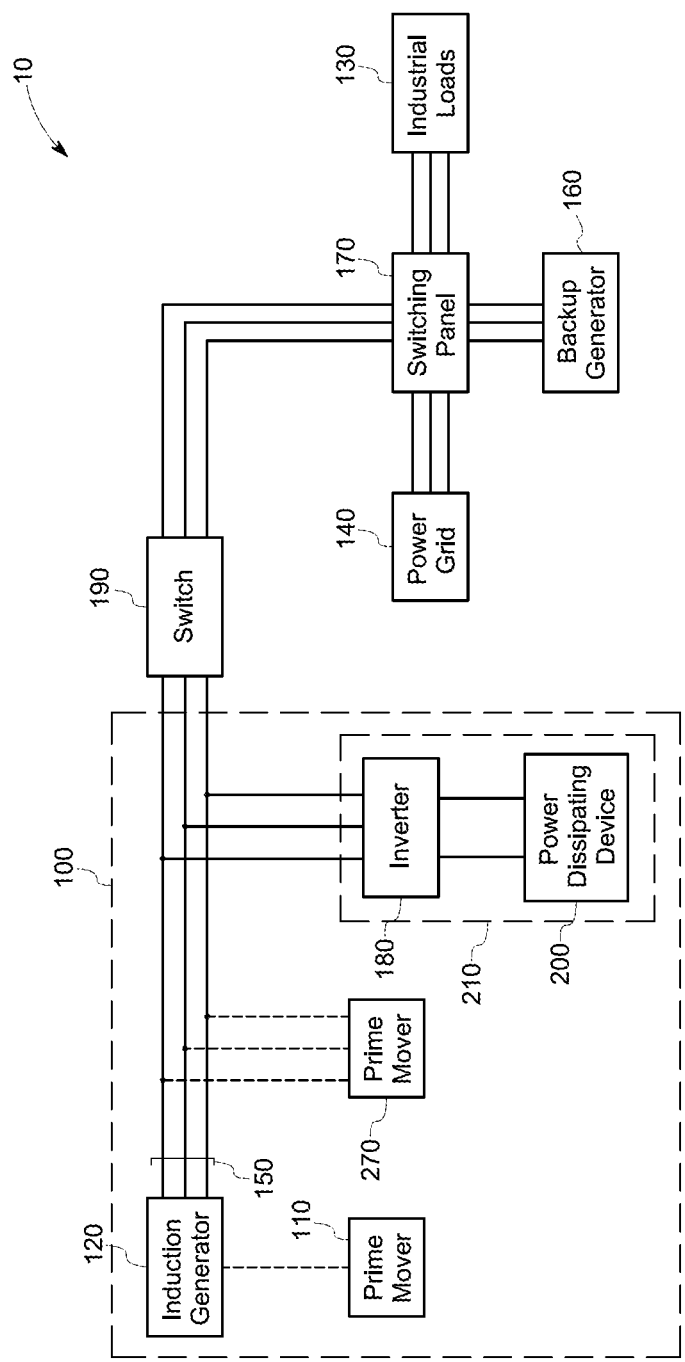
FIG. 5 is a block diagram representation of a power generation system including a capacitor bank operatively coupled to the AC link in accordance with an embodiment of the invention.

FIG. 5 is a block diagram representation of the power generation system 100 of FIG. 1 including a capacitor bank 270 operatively coupled to the AC link 150 in accordance with an embodiment of the invention. In this embodiment, the power generation system 100 may include the capacitor bank 270 that may be operatively coupled to the induction generator 120 via the AC link 150. The capacitor bank 270 may be used to provide part of the reactive power to the induction generator 120 in addition to the inverter 180 of FIG. 1. Use of the capacitor banks 270 helps in reducing costs of the inverter 180 as an inverter with lesser power rating may be used in conjunction with the capacitor banks 270 to provide the same reactive power to the induction generator 120. In one embodiment, a bank of switchable capacitors or a combination of the capacitor bank and the bank of switchable capacitors may be used instead of the capacitor bank to provide the reactive power.

Figure 6:
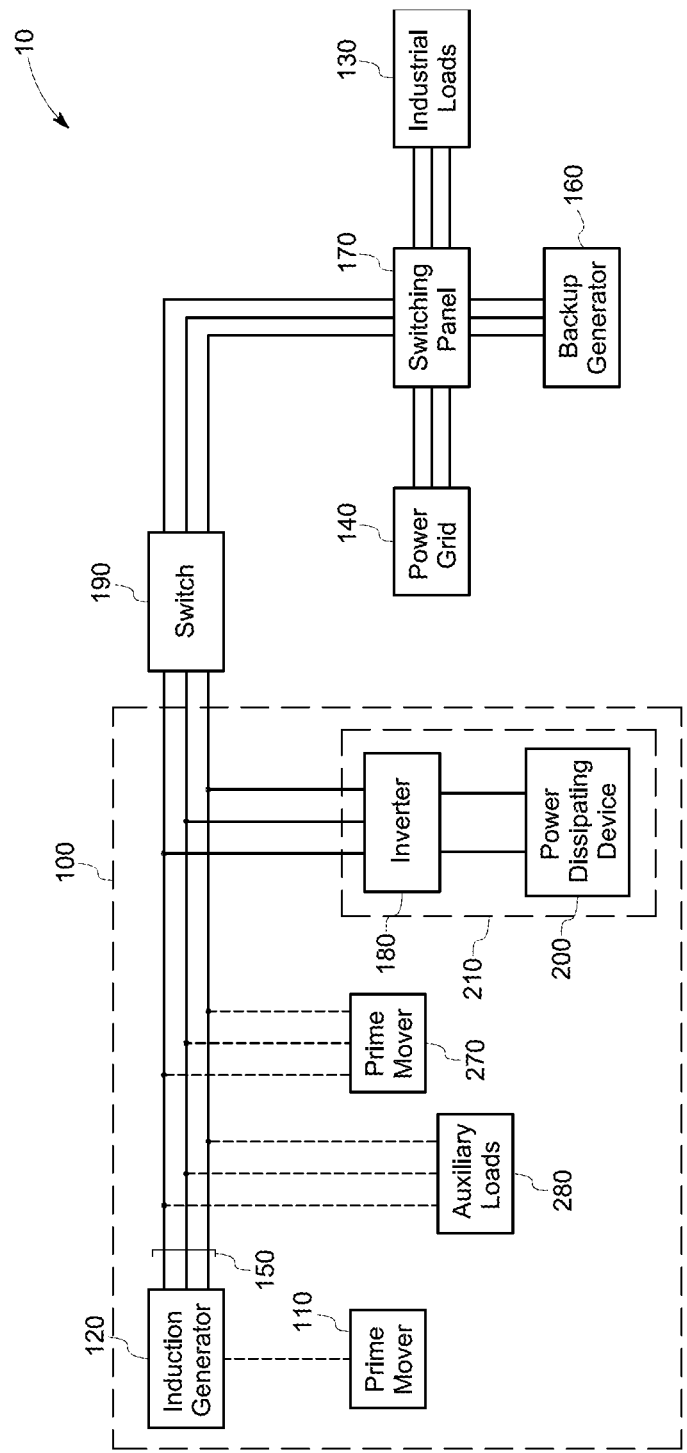
FIG. 6 is a block diagram representation of a power generation system including an auxiliary load operatively coupled to the AC link in accordance with an embodiment of the invention.

FIG. 6 is a block diagram representation of the power generation system 100 of FIG. 5 including an auxiliary load 280 operatively coupled to the AC link 150 in accordance with an embodiment of the invention. In this embodiment, the power generation system 100 may include auxiliary loads 280. Generally, the auxiliary loads 280 are operated using power provided by the induction generator 120. In conventional systems, during a grid-loss condition, the induction generators 120 are shutdown which in turn leads to non-operation of the auxiliary loads or an uninterrupted power supply (UPS) is used to provide power to the auxiliary loads 280. However, in this embodiment, the inverter 180 may provide power to the auxiliary loads 280. In one embodiment, the inverter 180 may provide power to the auxiliary loads 280 during a predetermined time taken by the backup generator 160 to initiate its operations. The presence of the auxiliary loads 280 also helps in reducing costs of the inverter 180 and the power dissipating device 200, as an inverter with lesser power rating may be used in conjunction with the auxiliary loads 280 as the auxiliary loads 280 may use at least some of the power generated by the induction generator 120.

Figure 7:
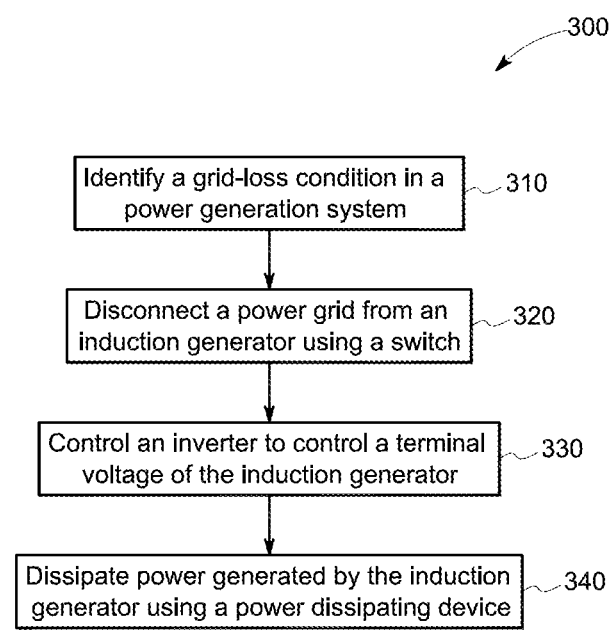
FIG. 7 is a flow chart representing steps involved in a method for providing a grid-loss ride-through capability to an induction generator in a power generation system in accordance with an embodiment of the invention.

FIG. 7 is a flow chart representing steps involved in a method 300 for providing a grid-loss ride-through capability to an induction generator in a power generation system in accordance with an embodiment of the invention. The method 300 includes identifying a grid-loss condition in the power generation system in step 310. In one embodiment, an inverter identifies the grid-loss condition. The power grid is disconnected from an induction generator using a switch in step 320. In one embodiment, a backup generator is activated upon identification of the grid-loss condition. In one embodiment, the inverter synchronizes the induction generator with the backup generator upon activation of the backup generator. In another embodiment, the induction generator is connected to the backup generator by the switch after synchronizing the induction generator with the backup generator. Furthermore, the inverter controls a terminal voltage of the induction generator in step 330. The induction generator generates power that is dissipated using a power dissipating device in step 340. The method 300 further includes deactivating the backup generator upon restoration of a power grid and synchronizing the induction generator with the power grid using the inverter. In one embodiment, the induction generator may be shut down by reducing speed of the induction generator at a predefined rate using the inverter if operations of the backup generator are not initiated within a predetermined time. In another embodiment, the inverter is controlled to provide reactive power to the induction generator upon restoration of the power grid. In one embodiment, the reactive power may be provided to the induction generator by a capacitor bank, a bank of switchable capacitors, or a combination thereof.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A power generation system comprising:
a prime mover for transforming a first energy to a second energy;
an induction generator operatively coupled to the prime mover and configured to generate electrical power using the second energy, with the operatively coupled prime mover configured to shut down the induction generator by reducing speed of the induction generator at a predefined rate upon conditions during a grid-loss condition;
an inverter electrically coupled to the induction generator for controlling a terminal voltage of the induction generator during the grid-loss condition; and
a power dissipating device operatively coupled to the inverter for dissipating power generated by the induction generator during the grid-loss condition.

2. The system of claim 1, wherein the prime mover comprises a gas turbine, a steam turbine, a combination of the gas turbine and the steam turbine, or a wind turbine.

3. The system of claim 1, wherein the prime mover comprises an organic rankine cycle based power generation system.

4. The system of claim 1, wherein the inverter comprises a static synchronous compensator.

5. The system of claim 1, wherein the power dissipating device comprises a resistive element.

6. The system of claim 1, further comprising a capacitor bank or a bank of switchable capacitors or a combination thereof operatively coupled to the induction generator.

7. The system of claim 6, wherein the capacitor bank or the bank of switchable capacitors or the combination thereof is configured to provide reactive power to the induction generator.

8. The system of claim 1, further comprising one or more auxiliary loads operatively coupled to the induction generator.

9. The system of claim 8, wherein the one or more auxiliary loads receive power from the inverter during the grid-loss condition.

10. The system of claim 1, further comprising a switch configured to connect or disconnect the induction generator from a power grid.

11. The system of claim 1, wherein the conditions for shutting down the induction generator are non-initiation of a backup generator within a predetermined time.

12. The system of claim 11, wherein the backup generator comprises a diesel generator.

13. A method comprising:
identifying a grid-loss condition in a power generation system having a prime mover and a backup generator;
disconnecting a power grid from an induction generator using a switch;
controlling an inverter to control a terminal voltage of the induction generator;
dissipating power generated by the induction generator using a power dissipating device; and
shutting down the induction generator by reducing speed of the induction generator at a predefined rate using the prime mover upon conditions during a grid-loss condition.

14. The method of claim 13, further comprising using the inverter for synchronizing the induction generator with the backup generator upon activation of the backup generator.

15. The method of claim 13, further comprising connecting the backup generator with the induction generator using the switch after synchronizing the induction generator with the backup generator.

16. The method of claim 13, further comprising using the inverter to synchronize the induction generator with the power grid upon restoration of the power grid.

17. The method of claim 13, further comprising controlling the inverter to provide reactive power to the induction generator upon restoration of the power grid.

18. The method of claim 13, wherein the conditions for shutting down the induction generator are non-initiation of a backup generator within a predetermined time.

19. The method of claim 13, further comprising providing reactive power to the induction generator using at least one of a capacitor bank or a bank of switchable capacitors.

20. A system comprising:
a retrofit unit for providing a grid-loss ride-through capability to an induction generator in a power generation system, wherein the retrofit unit comprises:
an inverter operatively coupled to the induction generator and configured to control a terminal voltage of the induction generator during a grid-loss condition;
a power dissipating device electrically coupled to the inverter and configured to dissipate power generated by the induction generator during the grid-loss condition; and
a prime mover operatively coupled to the induction generator, with the prime mover configured to shut down the induction generator by reducing speed of the induction generator at a predefined rate upon conditions during a grid-loss condition.

* * * * *